(12) United States Patent
Weidinger et al.

(10) Patent No.: US 9,334,380 B2
(45) Date of Patent: May 10, 2016

(54) PROTECTED EXPANDED POLYALKYLIDENE TEREPHTHALATES

(75) Inventors: Jürgen Weidinger, Münster (DE); Christoph Zauner, Münster (DE); Daniel Klusmann, Münster (DE)

(73) Assignee: Armacell Enterprise GmbH & Co. KG, Waltersdorf (DE)

( * ) Notice: Subject to any disclaimer, the term of this patent is extended or adjusted under 35 U.S.C. 154(b) by 254 days.

(21) Appl. No.: 13/208,912

(22) Filed: Aug. 12, 2011

(65) Prior Publication Data
US 2012/0045602 A1 Feb. 23, 2012

(30) Foreign Application Priority Data
Aug. 18, 2010 (EP) .................................... 10173212

(51) Int. Cl.
*C08J 7/06* (2006.01)
*C08J 9/36* (2006.01)

(52) U.S. Cl.
CPC .. *C08J 7/06* (2013.01); *C08J 9/365* (2013.01); *C08J 2367/02* (2013.01); *Y10T 428/139* (2015.01); *Y10T 428/269* (2015.01); *Y10T 428/31855* (2015.04)

(58) Field of Classification Search
CPC .......... C08J 7/06; C08J 9/365; C08J 2367/02; Y10T 428/139; Y10T 428/269; Y10T 428/31855
USPC .................. 428/36.9, 35.7, 339, 500; 252/62; 427/421.1, 428.01, 429, 430
See application file for complete search history.

(56) References Cited

U.S. PATENT DOCUMENTS

| | | | | |
|---|---|---|---|---|
| 2,803,575 A | * | 8/1957 | Riddell et al. | 428/312.4 |
| 3,384,609 A | * | 5/1968 | Signouret et al. | 523/219 |
| 3,985,198 A | * | 10/1976 | Kurtze et al. | 181/286 |
| 4,136,215 A | * | 1/1979 | den Otter et al. | 427/204 |
| 4,292,363 A | * | 9/1981 | Briggs | 442/348 |
| 4,426,458 A | * | 1/1984 | Woodhams | 501/140 |
| 4,459,334 A | | 7/1984 | Blanpied et al. | |
| 4,869,037 A | * | 9/1989 | Murphy | 52/238.1 |

(Continued)

FOREIGN PATENT DOCUMENTS

| | | |
|---|---|---|
| CH | 650196 A5 | 7/1985 |
| DE | 2517095 A1 | 11/1975 |

(Continued)

OTHER PUBLICATIONS

Machine Translation of DE 19803915 Jun. 1999.*

(Continued)

*Primary Examiner* — Michael C Miggins
(74) *Attorney, Agent, or Firm* — Rothwell, Figg, Ernst & Manbeck P.C.

(57) ABSTRACT

A material comprising an expanded polyalkylidene terephthalate based layer (A) being covered with at least one outer layer (B) comprising at least 50 weight-% of a solvent (including water) soluble inorganic chalcogen based compound, an easy-to-apply, but versatile method for significantly improving the fire retardant, anti-hydrolytic and mounting/coating properties of expanded polyalkylidene terephthalate polyester products by cold coating of the surface layer(s) of foams and sponges, the manufacturing of such products and the use of such products.

24 Claims, 2 Drawing Sheets

(56) References Cited

U.S. PATENT DOCUMENTS

| | | | |
|---|---|---|---|
| 5,288,764 A * | 2/1994 | Rotter et al. | 521/81 |
| 5,580,624 A * | 12/1996 | Andersen et al. | 428/34.5 |
| 5,665,442 A * | 9/1997 | Andersen et al. | 428/36.4 |
| 6,066,580 A | 5/2000 | Yoshida et al. | |
| 6,214,450 B1 * | 4/2001 | Wickert et al. | 428/220 |
| 2002/0128352 A1 * | 9/2002 | Soane et al. | 523/200 |
| 2004/0181867 A1 * | 9/2004 | Bonelli et al. | 4/498 |

FOREIGN PATENT DOCUMENTS

| | | | |
|---|---|---|---|
| DE | 4436429 A1 | | 4/1996 |
| DE | 19803915 | * | 6/1999 ............ B28B 19/00 |
| DE | 102005032557 A1 | | 2/2007 |
| DE | 102007048801 A1 | | 4/2009 |
| EP | 0866089 A1 | | 9/1998 |
| EP | 1754746 A1 | | 2/2007 |
| EP | 1884352 A2 | | 2/2008 |
| GB | 882296 | | 11/1961 |
| GB | 1161045 | | 8/1969 |
| GB | 2122232 A | | 1/1984 |
| GB | 2222185 A | | 2/1990 |
| GB | 2344834 A | | 6/2000 |
| GB | 2355024 A | | 4/2001 |
| JP | 52115878 A | | 9/1977 |
| JP | 62-4729 A | | 1/1987 |
| JP | 1-261588 A | | 10/1989 |
| JP | 2-43038 A | | 2/1990 |
| JP | 2-215521 A | | 8/1990 |
| JP | 4-347252 A | | 12/1992 |
| JP | 5-117501 A | | 5/1993 |
| JP | 8-68164 A | | 3/1996 |
| JP | 8-151470 A | | 6/1996 |
| JP | 8-199709 A | | 8/1996 |
| JP | 10-119219 A | | 5/1998 |
| JP | 2003-211610 A | | 7/2003 |
| JP | 2004-100236 A | | 4/2004 |
| JP | 2008-201079 A | | 9/2008 |
| KR | 10-0701274 B1 | | 3/2007 |
| RU | 2352601 C2 | | 4/2009 |
| WO | 00/66848 A1 | | 11/2000 |
| WO | 01/51549 A1 | | 7/2001 |

OTHER PUBLICATIONS

Machine Translation of EP 1 754 746 (Feb. 2007).*
European Search Report issued in EP appln. No. 10173212.1 on Nov. 3, 2010, 5 pages.

* cited by examiner

PROTECTED EXPANDED POLYALKYLIDENE TEREPHTHALATES

CROSS REFERENCE TO RELATED APPLICATIONS

This application claims priority from European patent application No. 10143212.1 filed on Aug. 18, 2010, all of which is incorporated herein by reference in its entirety for all purposes.

The present invention relates to material comprising an expanded polyalkylidene terephthalate based layer (A) being covered with at least one outer layer (B) comprising at least 50 weight-% of a solvent (including water) soluble inorganic chalcogen based compound, i.e. an easy-to-apply, but versatile method for significantly improving the fire retardant, anti-hydrolytic and mounting/coating properties of expanded polyalkylidene terephthalate polyester products by cold coating of the surface layer(s) of said foams and sponges, the manufacturing of such products and the use of such products.

Expanded polyester polymers, i.e. polyester foam or sponge, are of major importance for a large number of applications related to e.g. insulation against temperature gradients, noise shielding, vibration damping, lightweight construction etc. However, they are generally very sensitive to combustion through fire due to their organic nature caused by the polymer backbone, and due to the fact that hetero atoms having an additional negative effect on stability, such as oxygen, are part of the polymers. What makes the situation even worse is the fact that cellular polyesters are of course weaker than massive material, the surface is much higher, thus, more accessible for pyrolytic degradation, and air is already available in the cells in case of ignition. Therefore, polyesters in general are easily flammable and tend to continue burning once ignited. Polyalkylidene terephthalates (e.g. PET, PBT) are even more critical in this case as they are even easier to ignite than other polyesters and often will release more heat when burning. Thus, most methods for fire protection being efficient for other polyesters fail with polyalkylidene terephthalates, such as mixing of halogenated and non-halogenated flame retardants, non-combustible fillers etc. into the blend. However, as the manufacturing process of polyalkylidene terephthalate foams is almost always a reactive foaming process (see e.g. EP 0866089, JP 5117501, JP 62004729, JP 8151470, U.S. Pat. No. 5,288,764, WO 2001051549) foreign substances may severely impact the expansion or foaming of the polymers as well as other final properties targeted for the intended applications. Additionally, these foreign substances would have to withstand the processing conditions which might be e.g. almost 300° C. when speaking about polyethylene terephthalate (PET). Most of the standard flame retardant agents would not survive these temperatures and decompose during the process. Other more stable substances, such as inorganic fillers, fibres etc., either will negatively influence the chain length of the polymers or the cell structure or simply can not be compounded into the matrix to an extent where a significant effect could be achieved. Additionally, care has been taken that any treatment of the polyethylene terephthalate has to be checked for possible acceleration or initiation (or acid/alkali catalysis) of hydrolytic decomposition of the polymer. To overcome these issues some works have been done on the field of coating and lamination technologies where the restriction provided by the processing of the expanded polyester is not given. KR 100701274 discloses a polyethylene terephthalate (PET) carpet layer with phosphorous as flame retardant. In JP 2008201079, JP 10119219, JP 8068164, JP 1261588, GB 2344834, GB1161045, GB 2222185, GB 882296 and U.S. Pat. No. 6,066,580 polyester, polyester fibre or polyester/glass fibre lamination is used to protect the more flammable foam core consisting of other polymers; GB 2122232 is discussing a treatment of foam or its protective layers with halogen/antimony compounds. Using, mainly aluminium, foil is a rather widespread method, see e.g. in JP 2215521, JP 4347252, JP 8199709, U.S. Pat. No. 4,459,334, CH 650196 etc. However, these multilayer methods bear some source for failure, such as the additional uncertainties provided by the necessary adhesive (flammability, durability, compatibility etc.). Even aluminium foil will fail in most fire tests as the flame temperatures generally exceed its melting point. Some rather lightweight compounds in the building industry, such as in DE 4436429 (epoxy layer with flame retardants on PU/PS), EP 1754746 (polymer bound filled layer on PS/polyolefin), JP 02043038 (incombustible fabric glued by polymer cement/mortar on a fibre filled foam) or JP 2004100236, GB 2355024, EP 1884352, DE 2517095, DE 102005032557, DE 102007048801, RU 2352601 and WO 66848 (PS or PU foam board dip coated, glued onto or brought into other connection with cement, gypsum or concrete) try to overcome some of the a.m. issues by varying the composite structure, however, as the foamed polymer is PS, PU or PE/PP, the strength of the compound is low (typical compressive strength values: PS/PE/PP 50-500 kPa; PU: 200-800 kPa, PET: 900-1500 kPa) together with other lacks in performance. In fact, all a.m. solutions lack of applicability and performance when it comes to fulfilling nowadays' requirements concerning fire resistance approvals: e.g. flammability test related certifications within the building industry become more and more global, but also more precise and application-related and therefore more challenging (e.g. ASTM E-84 "tunnel burn test", UL 94 "horizontal/vertical burn", EN 13823 "round corner burn test", FM "room burn test"). Another issue is the fact that the at least "better working" among the a.m. solutions require the application of heat during the lamination of coating process to ensure good bonding or connection of functional layers. This, however, will always lead to deformation of the polyester foam which naturally is under tension after production due to the harsh manufacturing conditions. Application of additional heat will lead to tension release resulting in e.g. warping of boards or blocks, which of course would never be accepted in the building and construction sector. Another issue with the a.m. solutions occurs when it comes to further applicability, such as covering the materials with cement, mortar, paint etc., as usually the surface will be rendered inactive or too inert for further finishing. This will result in time and money consuming application of binders, adhesives etc.

A major object of the present invention thus is to provide an expanded polyalkylidene terephthalate polyester material and related process for manufacturing the same being flame retardant and stable versus deformation, but also versus hydrolytic cleavage, showing good applicability when it comes to further coating or bonding operations, all that without loosing any of the beneficial properties of polyalkylidene terephthalate foams, such as economy, low density, high Tg, controlled crystallinity, intrinsic strength etc., and maintaining a surface which is easily accessible for further operations.

Surprisingly, it is found that such a material not showing the above mentioned disadvantages can be achieved by applying a protective layer on the expanded polyester by a solvent and/or water based "cold coating" that is mainly consisting of inorganic material as a matrix which is giving a good direct bonding to the polyester and excellent accessibility for finishing operations, as well as significant improvement in fire retardant properties, such as general flammability and heat release.

Figure 1:
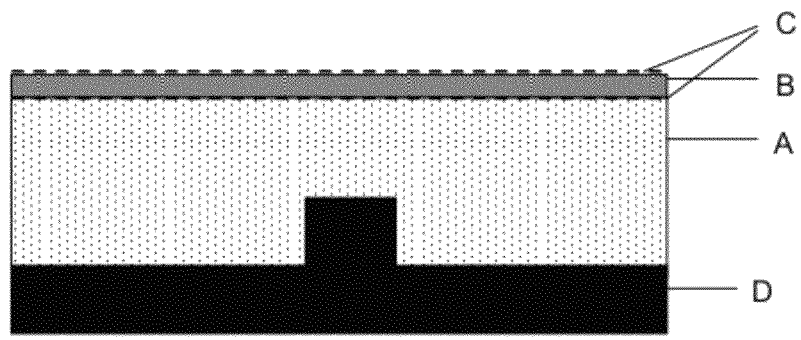
FIG. 1 is a schematic drawing of the claimed thermal and/or sound insulation material.

The claimed material comprises layer (A), see FIG. 1, which is an expanded polyalkylidene terephthalate based blend. The expanded polyalkylidene terephthalate based blend can show a mainly open or mainly closed cell structure (i.e. may be a sponge or foam) of any cell size and distribution. Preferred are polyalkylidene terephthalate polymer foams based on polyethylene terephthalate (PET). The expanded polyalkylidene terephthalate based blend of layer (A) may comprise virgin material or post consumer (recycled) material and may comprise other ingredients other than the polyester polymer itself, such as, but not exclusively: fillers (e.g. carbon blacks, metal, half metal and non metal oxides, hydroxides, silicates, phosphates, sulphates; glass or ceramic fillers as powder, beads etc; recycled polymers based blends etc.), other polymers (e.g. thermoplasts, thermosets, thermoplastic elastomers, elastomers, resinous blends), fibres (e.g. from glass, polyester, polyamide, polyimide, polyaramide, hemp, wool, cellulose, cotton etc.; as pulp, chopped fibre, nonwoven etc.), additives (e.g. plasticizers, softeners, emulsifiers, phase transfer catalysts etc.), colours, crosslinkers, self-ceramifying substances, char-forming agents, intumescent systems, stabilizers (e.g. versus heat, reversion, radiation etc.), flame retardant agents (such as, but not exclusively, halogen containing substances, phosphorous compounds, water releasing chemicals, and mixtures thereof) etc., and any respective mixtures thereof. The expanded polyalkylidene terephthalate based blend may be obtained by reactive or non reactive extrusion or moulding. Preferred is the manufacturing by reactive extrusion by help of chain extenders, such as anhydrides. The polyalkylidene terephthalate can be expanded by physical and/or chemical blowing agents. (A) can be expanded to densities between 30 kg/m3 and 500 kg/m3, preferably between 45 kg/m3 and 120 kg/m3 according to ISO 845 for best insulation properties. The achievable thermal conductivity is between 0.5 W/mK and 0.015 W/mK, preferably between 0.051 and 0.020 W/mK according to EN 12667.

The claimed material comprises at least one additional layer (B), see FIG. 1, based on at least one solvent (including water) soluble inorganic compound. The inorganic compound comprises any inorganic material that solidifies or sets (harden, crosslink) in cold to warm state (from −10° C. to +80° C.) during evaporation of the solvent and/or by influence of air and/or vacuum and/or humidity and/or one of its components (e.g. $CO_2$), such as, but not exclusively, all kinds of generally calcium carbonate and/or cement based compounds (e.g. chalk, cement, mortar, concrete etc.), gypsum based compounds (e.g. gypsum, plaster, stucco etc.), clay based compounds, silicate compounds (e.g. aluminum silicates, kieselguhr, diatomaceous earth, mountain flour, zeolites) and the like, and any mixtures thereof. Generally it can be stated that (B) majorly (at least 50 weight-%) comprises inorganic chalcogen compounds.

Layer (B) may comprise fillers (e.g. carbon blacks; metal, half metal and non metal oxides, hydroxides, silicates, phosphates, sulphates; glass or ceramic fillers as powder, beads etc; polymers like thermoplasts, thermosets, thermoplastic elastomers, elastomers, resinous blends etc.).

Layer (B) furthermore may comprise fibres as internal reinforcing agents, such as, but not exclusively, from glass, minerals, ceramics, metals, polyester, polyamide, polyimide, polyaramide, hemp, wool, cellulose, cotton etc., as hollow or solid fibres.

Layer (B) also may comprise additives, such as, but not exclusively, binders and/or adhesion promoters (e.g. acrylics, vinyl acetates, silanes/siloxanes etc.), dispersers, emulsifiers, phase transfer catalysts, colours, crosslinkers, siccatives, ceramifying or char-forming agents, intumescent systems, stabilizers (e.g. versus coagulation), flame retardant agents etc., and any respective mixtures thereof.

Layer (B) may be applied as solid layer or as porous material. Porosity may be achieved by gas formation or inclusion during the solidification/drying process or by loading the inorganic compound with gas during mixing or application on (A).

(B) can be applied onto (A) on one or all sides/surfaces by various methods, such as, but not exclusively, coextrusion, co-moulding or overmoulding, (co)coating, spray coating, dip coating etc., in on-line or off-line processes, continuously or discontinuously. (B) can be brought onto (A) in dry state and then be wet with solvent or as a dispersion or emulsion of any concentration and viscosity in any solvent, from liquid to paste or putty. The solvent can be let evaporate or be removed faster e.g. by airflow and/or application of temperature up to maximum 80° C. to prevent warping of (A) and/or by application of vacuum. The minimum application temperature is determined by the solvent but should not go below −10° C.

(B) will give excellent connection to (A) due to (A)'s polyester, thus oxidic, nature being ideal for bonding to inorganic materials. The polarity of (A) as well as its chemistry will lead to direct and strong chemical bonding of (B) into (A). The high surface of the expanded material of (A) will multiply this effect.

Figure 2:
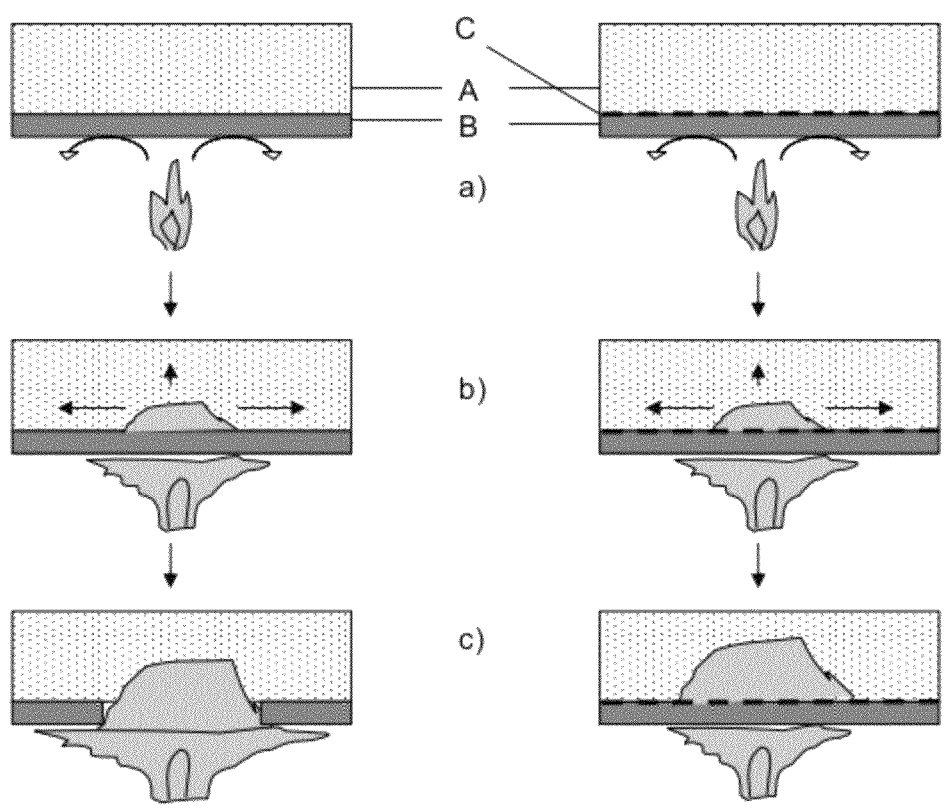
FIG. 2 is a schematic drawing demonstrating the flame and heat spreading and heat and flammable gas diluting function of the claimed material. a) shows the spread of flame on the surface of the protection layer (B) leading to delayed formation of decomposition gases; b) shows the dilution of said gases into the matrix (A); c) shows breakthrough of said flammable gases through the protection layer (B) (left) or the structure being maintained by reinforcement (C) leading to delay of breakthrough (right).

(B) will render the claimed material flame retardant to very flame retardant (see table 1) as it is firstly non combustible itself, will secondly disperse the flame and thus prevent local hot spots, and thirdly it will either prevent that flammable gases are formed by thermal decomposition of (A) or at least prevent such gases from breaking through to the flame. (B) therefore can act as barrier for flammable gases by blocking and diluting/dispersing them; the same is valid for flames as said above (see FIG. 2).

(B) furthermore can also act as gas/vapour barrier or diffusion facilitating layer during use, leading to a regulation of humidity in the whole layer. Additionally, (B) can have protective effect on (A) by stabilizing it against hydrolysis which is mainly caused by humidity in combination with strong alkalis. (B) should show a pH value between 2 and 10 to guarantee this functionality.

(B) can be applied in any thickness, however, to provide best performance concerned the mentioned properties a minimum thickness of 0.2 mm is preferred, as well as a maximum thickness of 15 mm to prevent formation of ruptures or other damage on or in the layer by too elevated rigidity. Especially preferred is a thickness range of 0.5 to 10 mm. (b) may be of smooth or structured surface. Structured surfaces will lead to better acoustic decoupling and sound dispersion, but also can improve thermal insulation properties.

The claimed material furthermore may comprise additional functional layers (C), see FIG. 1, consisting of e.g. paint, metal, fibre or plastics, as covering and/or intermediate without or in a matrix on or between (A) and/or (B) to act e.g. as a shielding, a reinforcing or as a decorative layer, see FIG. 1. Preferred are layers that will either be incombustible or flame-retardant themselves, or intumescent and/or char-forming or easily be burning or melting away so not to disturb the functioning of the (A) (B) flame retardancy system. Especially preferred are incombustible or flame retardant materials being applied between (A) and (B) in an open porous form (fibre, pulp, mesh, grid, tissue, woven, nonwoven) or in a closed form (foil or sheet) without or in a matrix. The layers (C) may be bond to (A) and/or (B) by adhesives, preferably flame retardant ones, or adhere by themselves. (C) can support the flame retardant properties of the claimed material, especially of (B), if it is a foil, mesh, tissue or nonwoven, as it provides additional structural integrity to (B) and will prevent flammable gases (formed from decomposing polyester) from breaking through to the flame in case of burn (see table 2 and FIG. 2).

The claimed material furthermore may contain any further element (D) necessary for the intended application, such as, but not exclusively, parts made from wood, glass, plastics, metal or concrete etc., structures for building purposes etc., to act as reinforcement, mounting aid, link etc., see FIG. 1. The elements (D) may be bond to other layers of the material by adhesives, preferably flame retardant ones, or adhere by themselves or may be incorporated mechanically.

It is a prominent advantage of the claimed material that it will not warp during or after being coated with the functional layer(s) (B) as the critical temperature for warping of polyalkylidene terephthalate blends (100-120° C.) is significantly above the processing temperature for said "cold coatings".

Another major advantage of the claimed material is the fact that hydrolytic attack on the polyester is prevented by the coating.

A major advantage of the claimed material is the fact that its manufacturing process will allow to enclose a broad variety of substances in high concentration into the outer layer, such as flame retardants that will render this layer incombustible or at least extremely difficult to ignite or burn through, and therefore will allow to generate properties that would never be achievable by additivation of the foam only or by use of polymer based, thus organic, layers.

This leads to another prominent advantage of the claimed material which is the fact that the developer and the process responsible can independently focus on optimization of the protective layer or the expanded core, their performance and their manufacturing, as the materials' properties and requirements are decoupled, which is not the case with expanded material that has been tried to be additivated directly.

This is linked to a further advantage of the claimed material which is the possibility to adapt its properties to the desired property profile (concerning mechanics, damping, insulation, flexibility, etc.) by possible independent modification of the core (A) and/or the layer (B) concerning respective thickness, loading with additives, crystallinity etc.

Another major advantage of the claimed material is the fact that the base material for (A) can be recycled/post consumer material, and that the main ingredients for (B) are both economic and environmentally friendly.

The term "post consumer" is defined as material being brought back into the process—i.e. being recycled—after its prior use, e.g. as PET bottles.

It is another advantage of the claimed material that the polyester foam core will not be affected (e.g. through hydrolytic cleavage or its catalysis) by the coating during manufacturing and use as the coating is chemically neutral versus the polyalkylidene terephthalate. The coating will even act as protective layer (i.e. buffer) versus acid or alkali impact.

A very prominent advantage of the claimed material is the fact that the surface is accessible to adhesion and interaction of other compounds, e.g. can easily be painted or plastered.

A further prominent advantage of the claimed material is the fact that (B) will show excellent adhesion to (A) without any further measures and that the resulting composite will act as "one" material.

Another advantage of the claimed material is the fact that no additives have to be put into the major volume of the final part, i.e. the foam, leading to a more "clean" product This leads to another advantage of the claimed material as it is recycling-friendly due to the fact that pure polyester is obtained after removal of the top layer.

A basic advantage of the claimed material is the fact that in its preferred compositions it is free of both fibres, brominated substances and PVC, all of them being under survey and being discussed for environmental and health issues.

A further advantage of the claimed material is that its flame retardant properties are almost independent from the geometry of the part to be protected.

It is a prominent advantage of the claimed material that it can be produced in an economic way in a continuous process, e.g. by extrusion and coating in various manners as discussed above. It shows versatility in possibilities of manufacturing and application and thus it can be applied in unrestricted shaping onto various surfaces in automotive, transport, aeronautics, building and construction, furniture, machinery engineering and many other industries.

It is a further advantage of the claimed material that it can be transformed and given shape by standard methods being known in the industry and that it does not require specialized equipment.

It is another advantage of the claimed material that the coating itself can be expanded, thus contributing to the insulation properties of the composite and further reducing weight.

A further advantage of the claimed material is its suitability for thermal and sound/vibration insulation applications, e.g. in building industry, as expanded polyalkylidene terephthalate is known to be a very high strength material ideal for this kind of application where structural support is desired. Layer (B) here can act as sound decoupler or absorber, and as a vapour barrier and water repellent surface, but even—depending on its composition—as diffusion accelerator, e.g. when painted/coated with silica and/or silicone based compounds or the like.

EXAMPLES

In the following examples and comparative examples standard PET insulation foam (ArmaStruct®, Armacell GmbH, Munster, Germany) of 65 kg/m3 density was cut to 25 mm thickness and 500 mm width and length samples. The cold coated layers were applied on the foam parts by use of a trowel, followed by homogenizing the surface with a squeegee to obtain a layer thickness of approximately 0.5 mm, then letting the composite set at room temperature for 30 minutes (with coating 5 and 6, see table 1) or let set by applying a 40° C. air stream for 30 min (with coating 1-4). Table 1 is providing data for cold coating compositions.

TABLE 1

Composition of cold coating compounds

| Coating | Solvent | Ingredients | Suppliers |
|---|---|---|---|
| 1 | Water | Gypsum (adhesion modified) | Knauf; Iphofen, Germany |
| 2 | Water | Gypsum/cement 1:2 | Knauf; Holcim; Hamburg, Germany |
| 3 | Water | Limestone/silicate 1:3 | Fels; Goslar, Germany |
| 4 | Water | Gypsum/aluminium trihydrate 5:1 | Albemarle; Bergheim, Germany |
| 5 | Cyclopentane | Gypsum/chloroprene latex 6:1 | Knauf; Lanxess; Leverkusen, Germany |
| 6 | Water/Ethanol 1:1 | Gypsum/cement/SBR latex 6:2:1 | Knauf; Holcim; Lanxess |
| 1A | Water | Like 1, with glass fibre nonwoven between foam and coating | STW; Schenkenzell, Germany |
| 2A | Water | Like 2, with glass fibre nonwoven between foam and coating | STW |
| 3A | Water | Like 3, with aluminium mesh between foam and coating | Expanded Metal; Hartlepool, UK |
| 4A | Water | Like 4, with aluminium mesh between foam and coating | Expanded Metal |
| 5A | Cyclopentane | Like 5, with short cellulose fibres between foam and coating | STW |
| 6A | Water/Ethanol 1:1 | Like 6, with glass fibre nonwoven between foam and coating | STW |

The manufactured composites were partially examined for fire retardant behaviour according to EN 13823/EN 13501-1 (single burning item/round corner test), DIN 4102, and UL 94 (horizontal/vertical burn). Table 2 shows the results in comparison with untreated foam board of same thickness (comparative example, marked with asterisk). The examples without asterisks comprise claimed material.

TABLE 2

Flammability test results (n.e.: not examined)

| Coating | EN 13823/ 13501-1 | DIN 4102 | UL 94 - coating on one side/ two sides | ASTM E-84 | General evaluation |
|---|---|---|---|---|---|
| none* | E | fail | fail | 200/200 | Extremely flammable |
| 1 | C-s1-d0 | A2 | V-2/V-1 | 50/150 | Flame retardant |
| 2 | C-S1-d0 | A2 | V-2/V-1 | 50/200 | Flame retardant |
| 3 | C-S2-d0 | B1 | HB/V-1 | n.e. | Flame retardant |
| 4 | B-S2-d0 | B1 | V-2/V-0 | n.e. | Flame retardant |
| 5 | C-S1-d0 | B1 | V-2/V-1 | n.e. | Flame retardant |
| 6 | C-S3-d0 | B2 | HB/V-2 | n.e. | Flame retardant |
| 1A | B-S1-d0 | A2 | V-1/V-0 | 25/50 | Very flame retardant |
| 2A | B-S2-d0 | A2 | V-1/V-0 | 25/50 | Very flame retardant |
| 3A | B-S2-d0 | B1 | V-2/V-0 | n.e. | Flame retardant |
| 4A | B-S1-d0 | A2 | V-1/V-0 | n.e. | Very flame retardant |
| 5A | B-S3-d0 | B1 | V-2/V-1 | n.e. | Flame retardant |
| 6A | B-S3-d0 | B1 | V-1/V-1 | n.e. | Flame retardant |

We claim:

1. A material comprising an expanded polyalkylidene terephthalate based layer (A) being covered with at least one outer layer (B) comprising organic fibres as reinforcing agents and at least 50 weight-% of a solvent (including water) soluble inorganic chalcogen based compound which itself comprises an inorganic material that solidifies in cold to warm state during at least one of evaporation of the solvent or by at least one of influence of air, vacuum, humidity, or one of its components, wherein said layer (B) is cold-coated onto said layer (A) at a temperature ≤80° C. so that said layer (A) is not warped, wherein at least one additional layer comprising incombustible or flame retardant material is applied between (A) and (B) such that the at least one additional layer is in direct contact with at least one of (A) and (B).

2. The material according to claim 1 wherein the polyalkylidene terephthalate is polyethylene terephthalate (PET).

3. The material according to claim 1 wherein the expanded polyalkylidene terephthalate blend is obtained by reactive extrusion by help of chain extenders.

4. The material according to claim 1 wherein the polyalkylidene terephthalate is based on recycled/post consumer raw material.

5. The material according to claim 1 wherein layer (B) shows a pH value of 2-10.

6. The material according to claim 1 wherein (B) comprises at least one of flame retardant agents or anti-hydrolysis agents from 0.5 to 50 weight-percent.

7. The material according to claim 1 wherein additional layers are applied for protection, reinforcement and decoration purposes.

8. A thermal insulation, acoustic insulation, acoustic damping or vibration damping product, comprising the material of claim 1.

9. A thermal or sound insulation product useful inside or outside of structures, vessels, containers and pipes, walls, ceilings, floors, roofs, tanks, tubes and ducts comprising the material of claim 1.

10. The material of claim 1, wherein said incombustible or flame retardant material is open porous form and is fiber, pulp, mesh, grid, tissue, woven, or nonwoven.

11. The material of claim 1, further comprising nonwoven glass fiber between said layer (A) and said layer (B).

12. The material of claim 1, wherein said layer (A) has a closed cell structure.

13. The material of claim 1, wherein said solvent (including water) soluble inorganic chalcogen based compound is not a gypsum based compound.

14. The material according to claim 1 where the polyalkylidene terephthalate is expanded to a density between 30 kg/m3 and 500 kg/m3 according to ISO 845.

15. The material of claim 14 wherein said density is between 45 kg/m3 and 120 kg/m3.

16. The material according to claim 1 where the thermal conductivity of the expanded polyalkylidene terephthalate based blend is between 0.5 W/mK and 0.015 W/mK according to EN 12667.

17. The material of claim 16 wherein said conductivity is between 0.051 and 0.020 W/mK.

18. The material according to claim 1 wherein layer (B) has a thickness of 0.2 to 15 mm.

19. The material of claim 18 wherein said thickness is 0.5 to 10 mm.

20. A material comprising an expanded polyalkylidene terephthalate based layer (A) being covered with at least one outer layer (B) comprising at least 50 weight % of a solvent (including water) soluble inorganic chalcogen based compound which itself comprises an inorganic material that solidifies in cold to warm state during at least one of evaporation of the solvent or by at least one of influence of air, vacuum, humidity, or one of its components, wherein at least one additional layer comprising an incombustible or flame retardant closed form foil or sheet is applied between (A) and (B) such that the at least one additional layer is in direct contact with at least one of (A) and (B).

21. A process for manufacturing a material comprising an expanded polyalkylidene terephthalate based layer (A) being covered with at least one outer layer (B) comprising at least 50 weight-% of a solvent (including water) soluble, wherein at least one additional layer comprising incombustible or flame retardant material in an open porous form or in a closed form without or in a matrix is applied between (A) and (B) such that the at least one additional layer is in direct contact with at least one of (A) and (B), comprising the steps of:
  providing said expanded polyalkylidene terephthalate material;
  forming said outer layer (B) by cold-coating a solvent (including water) soluble inorganic chalcogen based compound comprising an inorganic material that solidifies in cold to warm state and a solvent; and
  subjecting said expanded polyalkylidene terephthalate material with a solvent (including water) soluble inorganic chalcogen based compound comprising an inorganic material that solidifies in cold to warm state and a solvent to influence of at least one of air, vacuum, or humidity at a temperature ≤80° C. to effect evaporation of said solvent.

22. A process for manufacturing the material according to claim 21 wherein cold-coating is done by at least one of spraying, dipping, by squeegee, or roller(s).

23. A process for manufacturing a material comprising an expanded polyalkylidene terephthalate based layer (A) being covered with at least one outer layer (B) comprising at least 50 weight % of a solvent (including water) soluble inorganic chalcogen based compound which itself comprises an inorganic material that solidifies in cold to warm state during at least one of evaporation of the solvent or by at least one of influence of air, vacuum, humidity, or one of its components, wherein at least one additional layer comprising incombustible or flame retardant material in an open porous form or in a closed form without or in a matrix is applied between (A) and (B) such that the at least one additional layer is in direct contact with at least one of (A) and (B) in a two-step extrusion and coating process comprising the steps of:
  expanding a polyalkylidene terephthalate-based blend by reactive extrusion comprising chain extenders to obtain said expanded polyalkylidene terephthalate material;
  cold-coating said expanded polyalkylidene terephthalate material with a solvent (including water) soluble inorganic chalcogen based compound comprising an inorganic material that solidifies in cold to warm state and a solvent; and
  subjecting said expanded polyalkylidene terephthalate material with a solvent (including water) soluble inorganic chalcogen based compound comprising an inorganic material that solidifies in cold to warm state and a solvent to influence of at least one of air, vacuum, or humidity at a temperature ≤80° C. to effect evaporation of said solvent.

24. A material comprising an expanded polyalkylidene terephthalate based layer (A) being covered with at least one outer layer (B) comprising at least 50 weight-% of a solvent (including water) soluble inorganic chalcogen based compound which itself comprises an inorganic material that solidifies in cold to warm state during at least one of evaporation of the solvent or by at least one of influence of air, vacuum, humidity, or one of its components, wherein said layer (B) is cold-coated onto said layer (A) at a temperature ≤80° C. so that said layer (A) is not warped; and an aluminum mesh between said layer (A) and said layer (B) such that the aluminium mesh is in direct contact with at least one of (A) and (B).

* * * * *